(12) United States Patent
Hobson et al.

(10) Patent No.: US 11,397,040 B2
(45) Date of Patent: Jul. 26, 2022

(54) CONTROL SCHEME FOR AUTOMATIC FAN MODE FOR USE WITH VARIABLE REFRIGERANT FLOW SYSTEMS

(71) Applicant: Lennox Industries Inc., Richardson, TX (US)

(72) Inventors: Ben Hobson, Dallas, TX (US); Hongbing Lian, Plano, TX (US); Der-Kai Hung, Dallas, TX (US); Steve Mersh, Murfreesboro, TN (US); Lin Lan, Colleyville, TX (US); Shahn Markarian, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 298 days.

(21) Appl. No.: 16/677,964

(22) Filed: Nov. 8, 2019

(65) Prior Publication Data

US 2021/0140700 A1 May 13, 2021

(51) Int. Cl.
*F25D 17/06* (2006.01)
*F25B 5/00* (2006.01)

(52) U.S. Cl.
CPC .............. *F25D 17/067* (2013.01); *F25B 5/00* (2013.01)

(58) Field of Classification Search
CPC ................ F25D 2323/024; F25B 49/02; F25B 2313/0293
See application file for complete search history.

(56) References Cited

U.S. PATENT DOCUMENTS

| 5,107,684 A * | 4/1992 | Nakayama | F24F 3/065 62/81 |
| 5,634,346 A * | 6/1997 | Ramakrishnan | F24F 11/30 62/89 |
| 9,417,005 B1 * | 8/2016 | Roth | F25B 49/02 |
| 10,047,967 B2 * | 8/2018 | Bentz | G05B 15/02 |
| 11,002,457 B2 * | 5/2021 | Turney | F24F 3/065 |

* cited by examiner

*Primary Examiner* — Ana M Vazquez
(74) *Attorney, Agent, or Firm* — Shackelford, Bowen, McKinley & Norton, LLP (57) ABSTRACT

An HVAC system includes an outdoor heat exchanger. A first indoor heat exchanger is fluidly coupled to the outdoor heat exchanger and disposed in a first zone. A second indoor heat exchanger is fluidly coupled to the outdoor heat exchanger and disposed in a second zone. A compressor is fluidly coupled to the outdoor heat exchanger, the first indoor heat exchanger, and the second indoor heat exchanger. A first zone controller is electrically coupled to the first indoor heat exchanger. The first zone controller is configured to measure a temperature in the first zone, compare the measured temperature to a setpoint temperature of the first zone, and responsive to a difference between the measured temperature and the setpoint temperature, adjust a speed of a first circulation fan independent of the speed of a second circulation fan.

20 Claims, 7 Drawing Sheets

CONTROL SCHEME FOR AUTOMATIC FAN MODE FOR USE WITH VARIABLE REFRIGERANT FLOW SYSTEMS

TECHNICAL FIELD

The present disclosure relates generally to heating, ventilation, and air conditioning (HVAC) systems and more particularly, but not by way of limitation, to automatic fan control schemes for use with variable-refrigerant flow ("VRF") systems.

BACKGROUND

This section provides background information to facilitate a better understanding of the various aspects of the disclosure. It should be understood that the statements in this section of this document are to be read in this light, and not as admissions of prior art.

VRF systems, also referred to as multi-split systems, are a type of heating, ventilation and air-conditioning system. In VRF systems, a single condensing unit is used to circulate refrigerant to multiple indoor evaporator units. VRF systems are commonly utilized in multi-unit structures such as hotels, offices, and multi-family housing and may be utilized to provide simultaneous cooling and heating to various units.

SUMMARY

Various aspects of the disclosure relate to a heating, ventilation, and air conditioning (HVAC) system. The HVAC system includes an outdoor heat exchanger. A first indoor heat exchanger is fluidly coupled to the outdoor heat exchanger and disposed in a first zone. A second indoor heat exchanger is fluidly coupled to the outdoor heat exchanger and disposed in a second zone. A compressor is fluidly coupled to the outdoor heat exchanger, the first indoor heat exchanger, and the second indoor heat exchanger. A first circulation fan is positioned to circulate air around the first indoor heat exchanger and a second circulation fan is positioned to circulate air around the second indoor heat exchanger. A first zone controller is electrically coupled to the first indoor heat exchanger. The first zone controller is configured to measure a temperature in the first zone, compare the measured temperature to a setpoint temperature of the first zone, and responsive to a difference between the measured temperature and the setpoint temperature, adjust a speed of the first circulation fan independent of the speed of the second circulation fan.

Various aspects of the disclosure relate to a heating, ventilation, and air conditioning (HVAC) system. The HVAC system includes an outdoor heat exchanger. A compressor is fluidly coupled to the outdoor heat exchanger. A plurality of indoor heat exchangers corresponds to a plurality of enclosed spaces. The plurality of indoor heat exchangers are coupled in parallel to the compressor. A first circulation fan of a plurality of circulation fans is disposed with a first indoor heat exchanger of the plurality of heat exchangers and configured to circulate air around the first indoor heat exchanger. A one controller is electrically coupled to each circulation fan of the plurality of circulation fans. Each zone controller is configured to: measure a temperature of a first enclosed space of the plurality of enclosed spaces, the first enclosed space containing the first indoor heat exchanger and the first indoor heat exchanger, compare the measured temperature to a setpoint temperature, and responsive to a difference between the measured temperature and the setpoint temperature, adjust a speed of the first circulation fan of the plurality of circulation fans in the first indoor space.

Various aspects of the disclosure relate to a method of fan speed control for an HVAC system. The method includes measuring, with a temperature sensor, a temperature of a zone of a plurality of zones. The measured temperature is communicated to a zone controller disposed within with the zone. The measured temperature of the zone is compared to a setpoint temperature of the zone. A speed of a circulation fan disposed within the zone is adjusted responsive to a difference between the measured temperature and the setpoint temperature independent from other zones of the plurality of zones.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
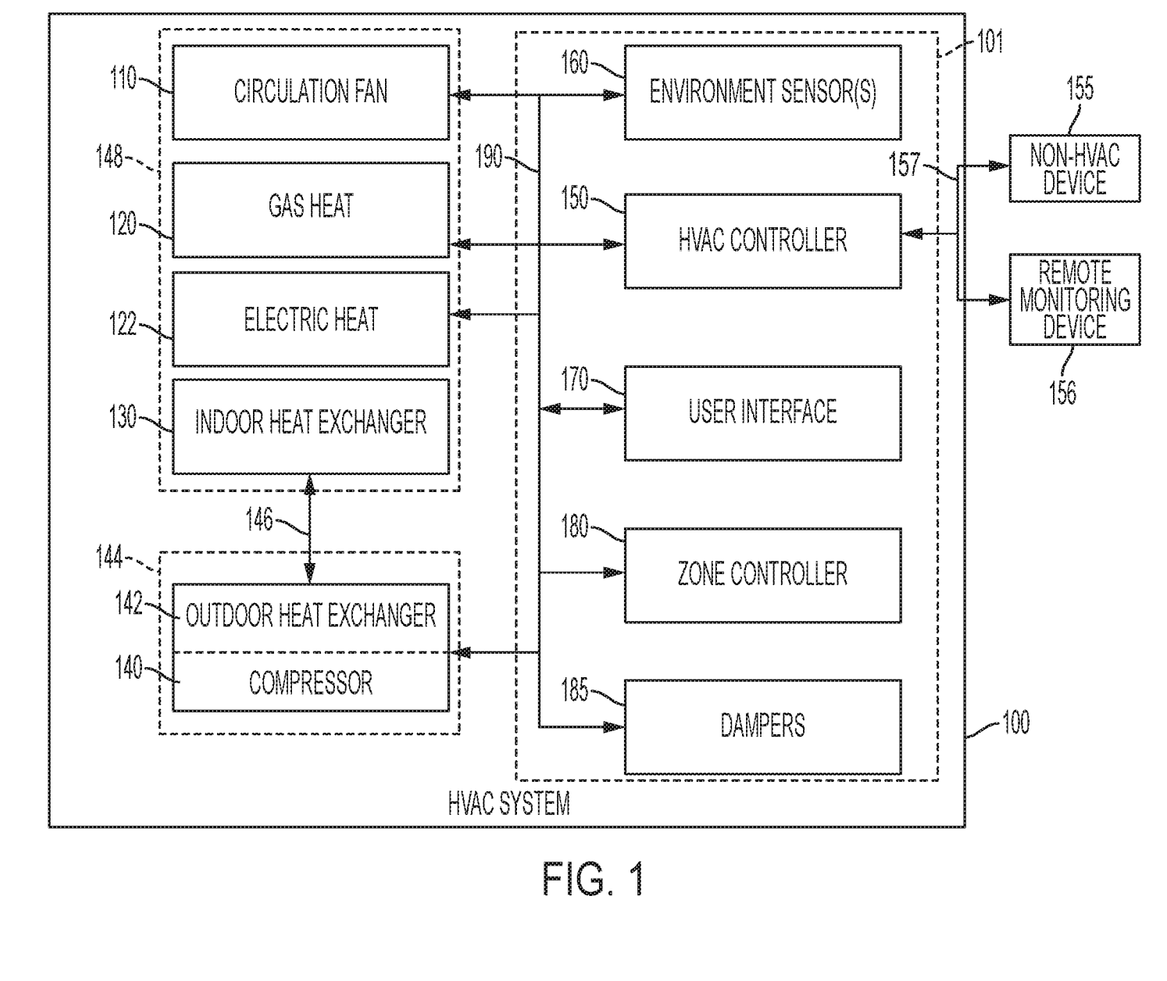
FIG. 1 is a block diagram of an HVAC system.

FIG. 1 illustrates an HVAC system 100. In a typical embodiment, the HVAC system 100 is a networked HVAC system that is configured to condition air via, for example, heating, cooling, humidifying, or dehumidifying air within an enclosed space 101. In a typical embodiment, the enclosed space 101 is, for example, an office building, a hotel, a multi-unit residential building, such as an apartment complex, and the like. For exemplary illustration, the HVAC system 100 as illustrated in FIG. 1 includes various components; however, in other embodiments, the HVAC system 100 may include additional components that are not illustrated but typically included within HVAC systems.

The HVAC system 100 includes a circulation fan 110, at least one of a gas heat 120 and an electric heat 122 typically associated with the circulation fan 110, and an indoor heat exchanger 130, also typically associated with the circulation fan 110. The circulation fan 110, the gas heat 120, the electric heat 122, and the indoor heat exchanger 130 are collectively referred to as an "indoor unit" 148. In a typical embodiment, the indoor unit 148 is located within, or in close proximity to, the enclosed space 101. The HVAC system 100 also includes a compressor 140 and an associated outdoor heat exchanger 142, which are typically referred to as an "outdoor unit" 144. In various embodiments, the outdoor unit 144 is, for example, a rooftop unit or a ground-level unit. The compressor 140 and the associated outdoor heat exchanger 142 are connected to an associated indoor heat exchanger 130 by a refrigerant line 146. In a typical embodiment, the compressor 140 is, for example, a single-stage compressor or a multi-stage compressor. The circulation fan 110, sometimes referred to as a blower, is configured to operate at different capacities (i.e., variable motor speeds) to circulate air through the HVAC system 100, whereby the circulated air is conditioned and supplied to the enclosed space 101.

Still referring to FIG. 1, the HVAC system 100 includes an HVAC controller 150 that is configured to control operation of the various components of the HVAC system 100 such as, for example, the circulation fan 110, the gas heat 120, the electric heat 122, and the compressor 140 to regulate the environment of the enclosed space 101. In some embodiments, the HVAC system 100 can be a zoned system. In such embodiments, the HVAC system 100 includes a zone controller 180, dampers 185, and a plurality of environment sensors 160. In a typical embodiment, the HVAC controller 150 cooperates with the zone controller 180 and the dampers 185 to regulate the environment of the enclosed space 101.

The HVAC controller 150 and the zone controller 180 may be an integrated controller or a distributed controller that directs operation of the HVAC system 100. In a typical embodiment, the HVAC controller 150 and the zone controller 180 includes an interface to receive, for example, thermostat calls, temperature setpoints, blower control signals, environmental conditions, and operating mode status for various zones of the HVAC system 100. For example, in a typical embodiment, the environmental conditions may include indoor temperature and relative humidity of the enclosed space 101. In a typical embodiment, the HVAC controller 150 and the zone controller 180 also includes a processor and a memory to direct operation of the HVAC system 100 including, for example, a speed of the circulation fan 110.

Still referring to FIG. 1, in some embodiments, the plurality of environment sensors 160 are associated with the HVAC controller 150 and the zone controller 180 and also optionally associated with a user interface 170. The plurality of environment sensors 160 provide environmental information within a zone or zones of the enclosed space 101 such as, for example, temperature and humidity of the enclosed space 101 to the HVAC controller 150. The plurality of environment sensors 160 may also send the environmental information to a display of the user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters such as, for example, a relative humidity of the enclosed space 101, and calculate operational parameters of the HVAC system 100 as disclosed herein.

In a typical embodiment, the HVAC system 100 is configured to communicate with a plurality of devices such as, for example, a monitoring device 156, a communication device 155, and the like. In a typical embodiment, the monitoring device 156 is not part of the HVAC system. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

In a typical embodiment, the communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101. Each of the designated zones include at least one conditioning or demand unit such as, for example, the gas heat 120 and at least one user interface 170 such as, for example, the thermostat. The zone-controlled HVAC system 100 allows the user to independently control the temperature in the designated zones. In a various embodiments, the zone controller 180 operates electronic dampers 185 to control air flow to the zones of the enclosed space 101. In various embodiments, the zone controller 180 operates a branch controller 211 (shown in FIG. 2) in order to regulate flow of refrigerant to various zones.

In some embodiments, a data bus 190, which in the illustrated embodiment is a serial bus, couples various components of the HVAC system 100 together such that data is communicated therebetween. In a typical embodiment, the data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINI-BAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 190, where appropriate. In particular embodiments, one or more data buses 190 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the circulation fan 110 or the plurality of environment sensors 160.

Figure 2:
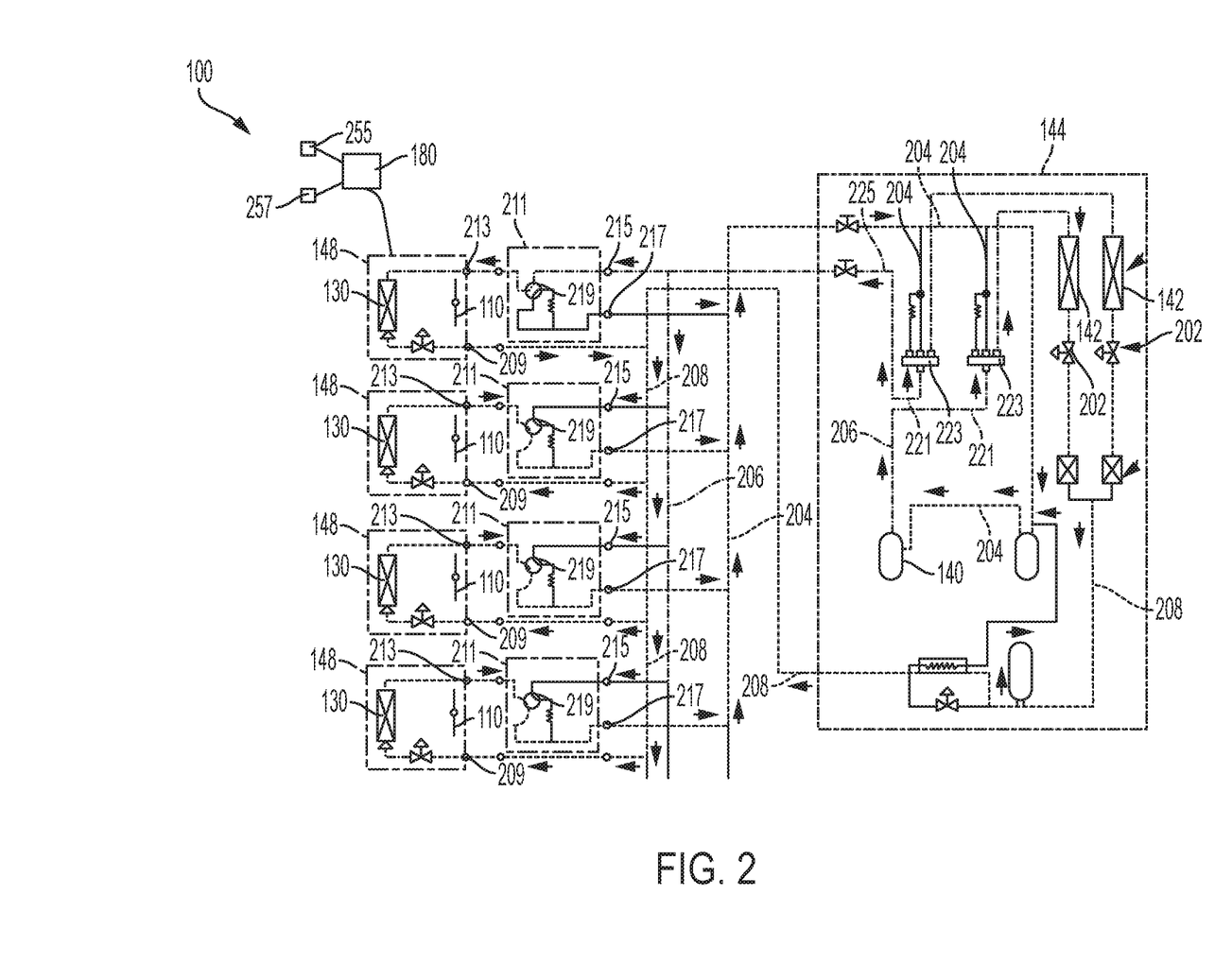
FIG. 2 is a schematic diagram of an HVAC system.

FIG. 2 is a schematic diagram of the HVAC system 100. The HVAC system 100 includes the outdoor unit 144 and at least one indoor unit 148. The HVAC system 100 illustrated in FIG. 2 includes, for example, four indoor units, however, in various embodiments, the HVAC system 100 may include any number of indoor units. The outdoor unit 144 includes an outdoor heat exchanger 142 and a compressor 140. Refrigerant is conducted from the compressor 140 to the outdoor heat exchanger 142 via a discharge line 206. Refrigerant travels into the compressor 140 via a suction line 204 and refrigerant is conducted from the outdoor heat exchanger 142 via a liquid line 208. The discharge line 206, the suction line 204, and the liquid line 208 couple the outdoor unit 144 to the indoor unit 148.

Still referring to FIG. 2, the indoor unit 148 includes an indoor heat exchanger 130 and a circulation fan 110. The indoor unit 148 is fluidly coupled to the liquid line 208 via a first fluid connection 209 and the indoor unit 148 is fluidly coupled to a branch controller 211 via a second fluid connection 213. The branch controller 211 includes a fluid inlet 215 that is coupled to the discharge line 206 and a fluid outlet 217 that is coupled to the suction line 204. The fluid inlet 215 and the fluid outlet 217 a couple via a reversing valve 219. The reversing valve 219 is capable of alternating the source of refrigerant flow through the indoor heat exchanger 130 between the discharge line 206 and the liquid line 208 to allow the indoor unit 148 to selectively operate in either a heating mode or a cooling mode. In the heating mode, the indoor heat exchanger 130 is fed from the discharge line 206 and in the cooling mode, the indoor heat exchanger 130 is fed from the liquid line 208.

Still referring to FIG. 2, during operation of at least one indoor unit 148 in the cooling mode, low-pressure, low-temperature refrigerant is circulated through the indoor heat exchanger 130 operating in the cooling mode. The refrigerant is initially in a liquid/vapor state. In a typical embodiment, the refrigerant is, for example, R-22, R-134a, R-410A, R-744, or any other suitable type of refrigerant as dictated by design requirements. Air from within the enclosed space 101, which is typically warmer than the refrigerant, is circulated around the indoor heat exchanger 130 by the circulation fan 110. In a typical embodiment, the refrigerant begins to boil after absorbing heat from the air and changes state to a low-pressure, low-temperature, super-heated vapor refrigerant. When the indoor unit 148 operates in the cooling mode, the indoor heat exchanger 130 functions as an evaporator. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant is conducted from the indoor heat exchanger 130 to the suction line 204 via the fluid outlet 217. The low-pressure, low-temperature, super-heated vapor refrigerant is introduced into the compressor 140 via the suction line 204. In a typical embodiment, the compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. The high-pressure, high-temperature, superheated vapor refrigerant leaves the compressor 140 via the discharge line 206. A first branch 221 of the discharge line 206 enters the outdoor heat exchanger 142 via a four-way valve 223. A second branch 225 of the discharge line 206 conducts refrigerant to an indoor unit 148 operating in the heating mode.

Still referring to FIG. 2, outside air is circulated around the outdoor heat exchanger 142 by an outdoor fan 210. The outside air is typically cooler than the high-pressure, high-temperature, superheated vapor refrigerant present in the outdoor heat exchanger 142. Thus, heat is transferred from the high-pressure, high-temperature, superheated vapor refrigerant to the outside air. Removal of heat from the high-pressure, high-temperature, superheated vapor refrigerant causes the high-pressure, high-temperature, super-heated vapor refrigerant to condense and change from a vapor state to a high-pressure, high-temperature, sub-cooled liquid state. When at least one indoor unit 148 operates in the cooling mode, the outdoor heat exchanger 142 functions as a condenser. The high-pressure, high-temperature, sub-cooled liquid refrigerant leaves the outdoor heat exchanger 142 via the liquid line 208 and enters a metering device 202.

In the metering device 202, the pressure of the high-pressure, high-temperature, sub-cooled liquid refrigerant is abruptly reduced. In various embodiments where the metering device 202 is, for example, a thermostatic expansion valve, the metering device 202 reduces the pressure of the high-pressure, high-temperature, sub-cooled liquid refrigerant by regulating an amount of refrigerant that travels to the indoor heat exchanger 130. Abrupt reduction of the pressure of the high-pressure, high-temperature, sub-cooled liquid refrigerant causes sudden, rapid, evaporation of a portion of the high-pressure, high-temperature, sub-cooled liquid refrigerant, commonly known as "flash evaporation." The flash evaporation lowers the temperature of the resulting liquid/vapor refrigerant mixture to a temperature lower than a temperature of the air in the enclosed space 101. The liquid/vapor refrigerant mixture leaves the metering device 202, via the liquid line 208, and returns to the indoor heat exchanger 130.

When at least one indoor unit 148 is operating in the heating mode, refrigerant enters the branch controller 211 via the fluid inlet 215 and is directed to the indoor heat exchanger 130 via the second fluid connection 213. When the indoor unit 148 operates in the heating mode, the indoor heat exchanger 130 operates as a condenser. The refrigerant exits the indoor heat exchanger 130 via the first fluid connection 209 to the liquid line 208. The refrigerant in the liquid line 208 is then circulated through those indoor units 148 that are operating in the cooling mode before being discharged to the suction line 204.

When all indoor units 148 are operating in the heating mode, the four-way valve 223 isolates the first branch 221 of the discharge line 206 such that refrigerant is transmitted to the outdoor heat exchanger 142 via the suction line 204 thereby causing the outdoor heat exchanger 142 to operate as an evaporator.

Still referring to FIG. 2, a temperature sensor 255 is disposed in the enclosed space 101 and is electrically coupled to the zone controller 180. In various embodiments, the temperature sensor 255 may be integral with the zone controller 180; however, in other embodiments, the temperature sensor 255 may be disposed separate from the zone controller 180 and coupled to the zone controller 180 via, for example, a wired connection or a wireless protocol. During operation, the temperature sensor 255 measures an air temperature within the enclosed space 101 (shown in FIG. 1) and communicates the measured temperature to the zone controller 180. In various embodiments, a humidity sensor 257 may also be electrically coupled to the zone controller 180 via a wired connection or a wireless protocol. During operation, the humidity sensor 257 measures a relative humidity of the enclosed space 101 and transmits the measured relative humidity to the zone controller 180.

Figure 3:
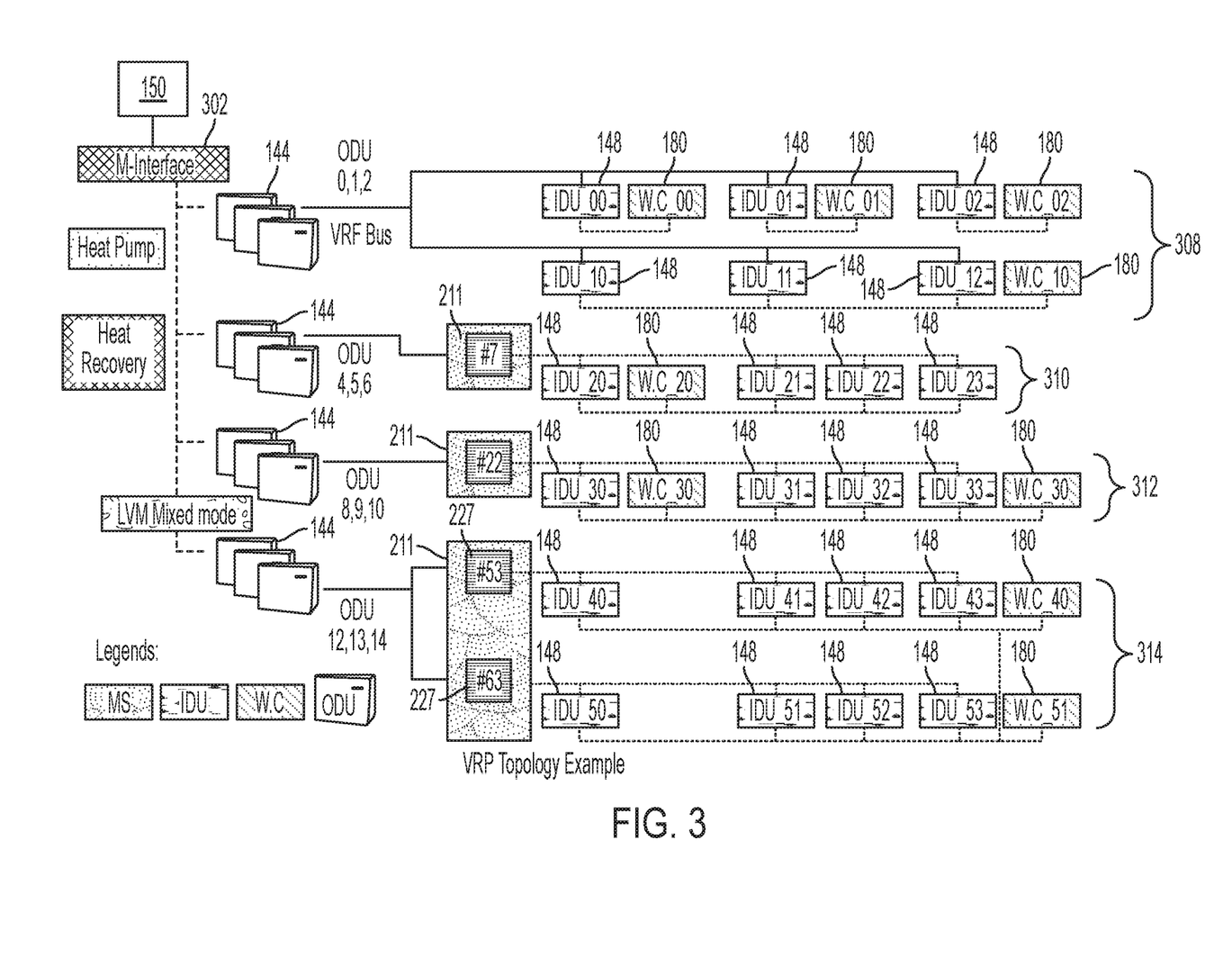
FIG. 3 is a block diagram of a VRF HVAC system according to aspects of the disclosure.

FIG. 3 is a block diagram of the HVAC system 100. By way of example, the HVAC system 100 in illustrated in FIG. 3 as a VRF system. The HVAC system 100 includes an interface 302 to the HVAC controller 150. In various embodiments, the interface 302 is a wired connection; however, in other embodiments, the interface 302 may include communication via a wireless protocol such as, for example, WiFi® or Bluetooth®. The interface 302 is electrically coupled to the outdoor unit 144. In the embodiment shown in FIG. 3, the interface is coupled to a plurality of outdoor units 144; however, in other embodiments, the interface 302 could be electrically coupled to a single outdoor unit 144 or any number of outdoor units 144. In the embodiment shown in FIG. 3, the outdoor units 144 define a first branch 308, a second branch 310, a third branch 312, and a fourth branch 314.

In the first branch 308, the HVAC system 100 is operating as a VRF heat pump. The outdoor unit 144 is fluidly coupled to, and circulates refrigerant between, a plurality of indoor units 148. A zone controller 180 is associated with the indoor units 148. In various embodiments, the zone controller 180 directs operation of a single indoor unit 148; however, in other embodiments, the zone controller 180 may direct operation of multiple indoor units 148. In various embodiments, the zone controller 180 controls a speed of the circulation fan 110 associated with the indoor unit 148. In a VRF heat pump as illustrated by the first branch 308, the indoor units 148 all provide cooling or all provide heating.

In the second branch 310, the third branch 312, and the fourth branch 314, the HVAC system 100 is operating as a VRF heat recovery unit. The outdoor unit 144 is fluidly coupled to the branch controller 211. The branch controller 211 directs refrigerant flow to the indoor units 148. The zone controller 180 is associated with the indoor units 148. In various embodiments, the zone controller 180 directs operation of a single indoor unit 148; however, in other embodiments, the zone controller 180 may direct operation of multiple indoor units 148. In various embodiments, the zone controller 180 controls a speed of the circulation fan 110 associated with the indoor unit 148. In various embodiments, the branch controller 211 may include one or more mode select modules 227. The branch controller 211 allows all indoor units 148 connected to a select mode select module 227 to provide cooling while other indoor units 148 connected to other mode select modules 227 may simultaneously provide heating.

Figure 4:
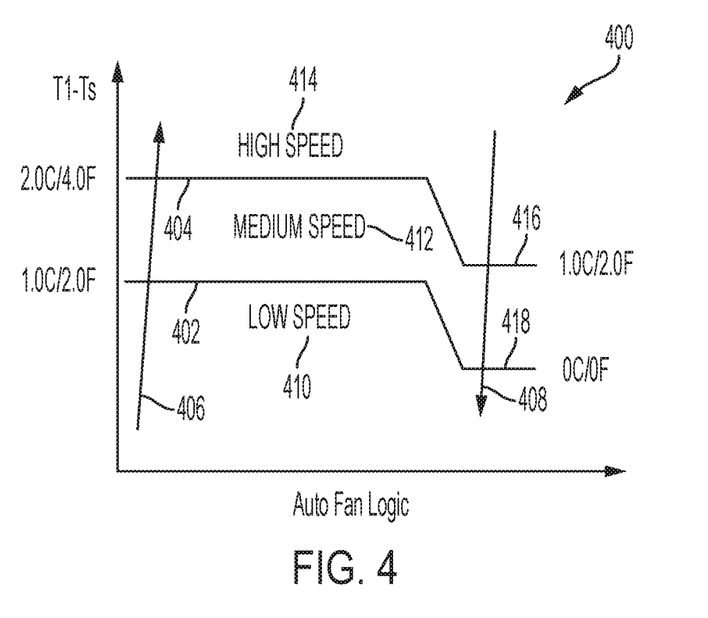
FIG. 4 is a graph illustrating an automatic fan control scheme for cooling according to aspects of the disclosure.

FIG. 4 is a graph illustrating an automatic control scheme 400 of the circulation fan 110. In various embodiments, the automatic control scheme 400 is embodied on computer-readable media within the zone controller 180. A difference between a room temperature ($T_1$) and a setpoint temperature ($T_s$) is plotted on the y-axis. Setpoint temperature or temperature setpoint refers to a target temperature setting of the HVAC system as set by a user or automatically based on a pre-defined schedule. Line 402 represents a first threshold temperature difference and line 404 represents a second threshold temperature difference. Arrow 406 represents increasing temperature difference and arrow 408 represents decreasing temperature difference. Region 410 represents operation of the circulation fan 110 at low speed, region 412 represents operation of the circulation fan 110 at medium speed, and region 414 represents operation of the circulation fan 110 at high speed. Thus, when the difference between the room temperature and the setpoint temperature is minimal, the HVAC system 100 operates in the region 410 and the circulation fan 110 operates at low speed. As the difference between the room temperature and the setpoint temperature increases, the HVAC system 100 crosses the first threshold temperature difference 402 and enters the region 412. Thus, the circulation fan 110 operates at medium speed. As the difference between the room temperature and the setpoint temperature increases, the HVAC system 100 crosses the second threshold temperature difference 404 and enters the region 414 where the circulation fan 110 operates at high speed.

When the temperature difference decreases according to arrow 408, the first threshold temperature difference 402 and the second threshold temperature difference 404 do not apply. Instead, a third threshold temperature difference 416 is utilized that is slightly lower than the second threshold temperature difference 404. Likewise, a fourth threshold temperature difference 418 is utilized that is slightly lower than the first threshold temperature difference 402. By using the third threshold temperature difference 416 and the fourth threshold temperature difference 418, hysteresis is employed to prevent undesirable switching between speeds of the circulation fan 110 during periods when the difference between the room temperature and the setpoint temperature is close to one of the first threshold temperature difference 402 or the second threshold temperature difference 404. By way of example, the embodiment shown in FIG. 4 illustrates the circulation fan 110 as having three speeds (low, medium, and high). In other embodiments, the circulation fan 110 may utilize a fan motor having four, five, six, or more speeds. Still referring to FIG. 4, when the circulation fan 110 switches, for example, from low speed to medium speed, a timer unit is employed such that the circulation fan 110 operates at the new fan speed for a minimum time period before the speed of the circulation fan 110 is subsequently changed. In various embodiments, the minimum time period may be, for example, five minutes; however, in other embodiments, any time period could be utilized.

Figure 5:
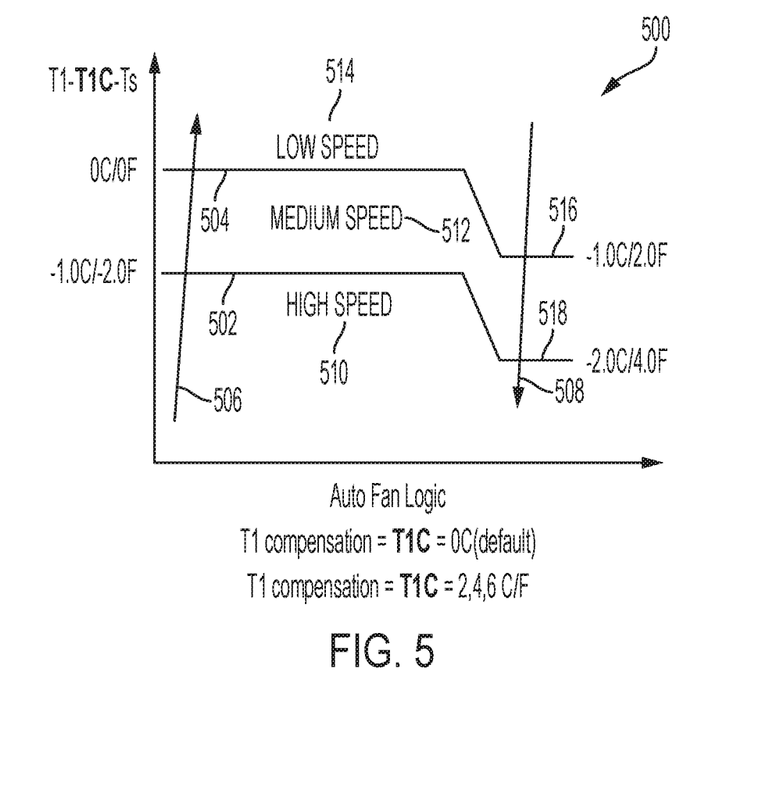
FIG. 5 is a graph illustrating an automatic fan control scheme for heating according to aspects of the disclosure.

FIG. 5 is a graph illustrating an automatic control scheme 500 of the circulation fan 110 for use in the heating mode. In various embodiments, the automatic control scheme 500 is embodied on computer-readable media within the zone controller 180. A difference between a room temperature ($T_1$) and a setpoint temperature ($T_s$) is plotted on the y-axis. Line 502 represents a first threshold difference and line 504 represents a second threshold temperature difference. Arrow 506 represents increasing temperature difference and arrow 508 represents decreasing temperature difference. Region 510 represents operation of the circulation fan 110 at low speed, region 512 represents operation of the circulation fan 110 at medium speed, and region 514 represents operation of the circulation fan 110 at high speed. Thus, when the difference between the room temperature and the setpoint temperature is minimal, the HVAC system 100 is in the region 510 and the circulation fan 110 operates at low speed. As the difference between the room temperature and the setpoint temperature increases, the HVAC system 100 crosses the first threshold temperature difference 502 and operates in the region 512 where the circulation fan 110 operates at medium speed. As the difference between the room temperature and the setpoint temperature increases, the HVAC system 100 crosses the second threshold temperature difference 504 and operates in the region 514 and the circulation fan 110 operates at high speed.

When the temperature difference decreases according to arrow 508, the first threshold temperature difference 502 and the second threshold temperature difference 504 do not apply. Instead, a third threshold temperature difference 516 is utilized that is slightly lower than the second threshold temperature difference 504. Likewise, a fourth threshold temperature difference 518 is utilized that is slightly lower than the first threshold temperature difference 502. By using the third threshold temperature difference 516 and the fourth threshold temperature difference 518, hysteresis is employed to prevent undesirable switching between speeds of the circulation fan 110 during periods when the difference between the room temperature and the setpoint temperature is close to one of the first threshold temperature difference 502 or the second threshold temperature difference 504. By way of example, the embodiment shown in FIG. 5 illustrates the circulation fan 110 as having three speeds (low, medium, and high). In other embodiments, the circulation fan 110 may include a fan motor having four, five, six, or more speeds. Still referring to FIG. 5, when the circulation fan 110 switches, for example, from low speed to medium speed, a timer unit is employed such that the circulation fan 110 operates at the new fan speed for a minimum time period before the speed of the circulation fan 110 is subsequently changed. In various embodiments, the minimum time period may be, for example, five minutes; however, in other embodiments, any time period could be utilized.

Figure 6A:
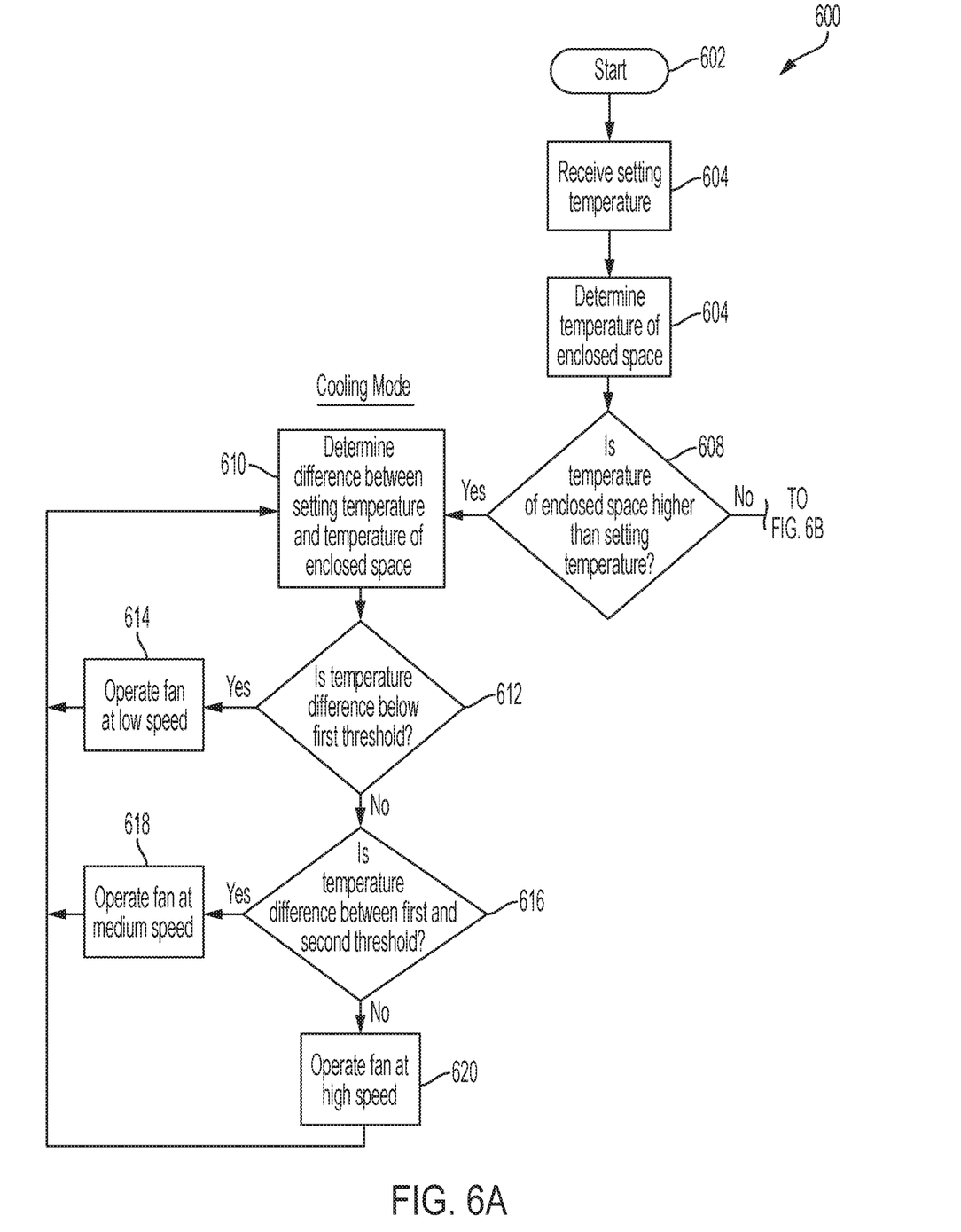
FIGS. 6A-B are flow diagrams illustrating a process for automatic fan control according to aspects of the disclosure.
Figure 6B:
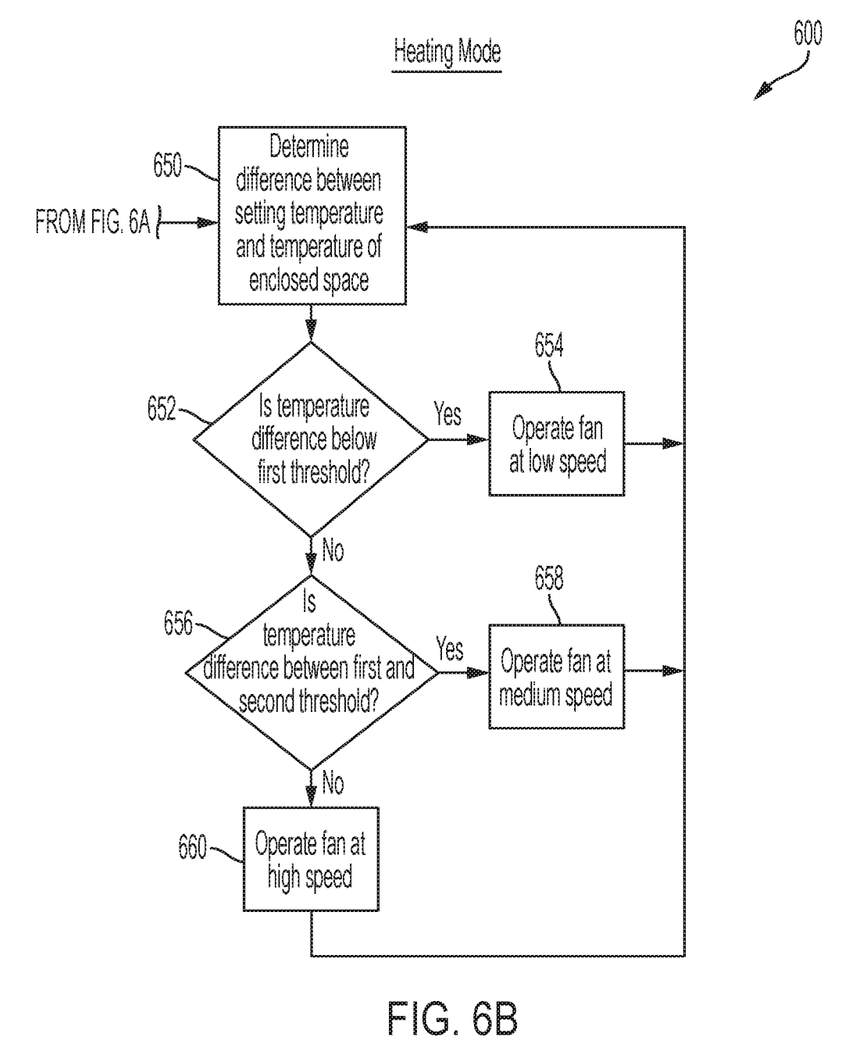

FIGS. 6A-B are flow diagrams illustrating a process 600 for automatic control of the speed of the circulation fan 110. The process 600 begins at step 602. At step 604, a setpoint temperature is received by the zone controller 180. In various embodiments, the setpoint temperature is a user-input value; however, in other embodiments, the setpoint temperature may be pre-defined. At step 606, the zone controller 180 determines a temperature of the enclosed space 101. At step 608, the zone controller 180 compares the temperature of the enclosed space 101 to the setpoint temperature. If, at step 608, it is determined that the temperature of the enclosed space 101 is higher than the setpoint temperature, then the process 600 proceeds to step 610 and the indoor unit 148 operates in the cooling mode. At step 610, a difference between the setpoint temperature and the temperature of the enclosed space 101 is determined. At step 612, it is determined if the temperature difference is below the first threshold temperature difference 402. If, at step 612, it is determined that the temperature difference is below the first threshold temperature difference 402, then the process 600 proceeds to step 614 and the circulation fan 110 operates at low speed. If, at step 612, it is determined that the temperature difference is above the first threshold temperature difference 402, then the process 600 proceeds to step 616 where it is determined if the temperature difference is between the first threshold temperature difference 402 and the second threshold temperature difference 404. If, at step 616, it is determined that the temperature difference is between the first threshold temperature difference 402 and the second threshold temperature difference 404, then the process 600 proceeds to step 618, where the circulation fan 110 operates at medium speed. If, at step 616, it is determined that the temperature difference is above the second threshold temperature difference 404, then the process 600 proceeds to step 620 where the circulation fan 110 operates at high speed. Following steps 614, 618, and 620, the process 600 returns to step 610.

Still referring to FIGS. 6A-B, if, at step 608, it is determined that the temperature of the enclosed space 101 is lower than the setpoint temperature, then the process 600 proceeds to step 650 and the indoor unit 148 operates in the heating mode. At step 650, a difference between the setpoint temperature and the temperature of the enclosed space 101 is determined. At step 652, it is determined if the temperature difference is below the first threshold temperature difference 502. If, at step 652, it is determined that the temperature difference is below the first threshold temperature difference 502, then the process 600 proceeds to step 654 and the circulation fan 110 operates at low speed. If, at step 652, it is determined that the temperature difference is above the first threshold temperature difference 502, then the process 600 proceeds to step 656 where it is determined if the temperature difference is between the first threshold temperature difference 502 and the second threshold temperature difference 504. If, at step 656, it is determined that the temperature difference is between the first threshold temperature difference 502 and the second threshold temperature difference 504, then the process 600 proceeds to step 658, where the circulation fan 110 operates at medium speed. If, at step 656, it is determined that the temperature difference is above the second threshold temperature difference 504, then the process 600 proceeds to step 660 where the circulation fan 110 operates at high speed. Following steps 654, 658, and 660, the process 600 returns to step 650.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within a percentage of" what is specified.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A heating, ventilation, and air conditioning (HVAC) system comprising:
    an outdoor heat exchanger;
    a first indoor heat exchanger fluidly coupled to the outdoor heat exchanger and disposed in a first zone;
    a second indoor heat exchanger fluidly coupled to the outdoor heat exchanger and disposed in a second zone;
    a compressor fluidly coupled to the outdoor heat exchanger, the first indoor heat exchanger, and the second indoor heat exchanger;
    a first circulation fan positioned to circulate air around the first indoor heat exchanger;
    a second circulation fan positioned to circulate air around the second indoor heat exchanger;
    a first zone controller electrically coupled to the first indoor heat exchanger, wherein the first zone controller is configured to:
        measure a temperature of the first zone;
        determine whether a difference exists between the measured temperature of the first zone and a setpoint temperature of the first zone;
        responsive to a determination that a difference exists between the measured temperature and the setpoint temperature, adjust a speed of the first circulation fan independent of the speed of the second circulation fan, wherein a timer unit is employed such that the first circulation fan operates at the adjusted speed for a minimum time period before the adjusted speed of the first circulation fan is subsequently changed;
        determine whether the difference between the measured temperature of first zone is higher or lower than the setpoint temperature of the first zone;
        responsive to a determination that the measured temperature of first zone is higher than the setpoint temperature of the first zone, operate the HVAC system in a cooling mode; and
        responsive to a determination that the measured temperature of first zone is lower than the setpoint temperature of the first zone, operate the HVAC system in a heating mode.

2. The HVAC system of claim 1, wherein responsive to the difference between the measured temperature and the setpoint temperature being below a first threshold temperature difference, the first zone controller directs the first circulation fan to operate at low speed.

3. The HVAC system of claim 1, wherein responsive to the difference between the measured temperature and the setpoint temperature being between a first threshold temperature difference and a second threshold temperature difference, the first zone controller directs the first circulation fan to operate at medium speed.

4. The HVAC system of claim 1, wherein responsive to the difference between the measured temperature and the setpoint temperature being above a second threshold temperature difference, the first zone controller directs the first circulation fan to operate at high speed.

5. The HVAC system of claim 1, comprising a humidity sensor electrically coupled to the first zone controller.

6. The HVAC system of claim 5, wherein the first zone controller adjusts the speed of the first circulation fan responsive to a measured relative humidity of the first zone.

7. A heating, ventilation, and air conditioning (HVAC) system comprising:
    an outdoor heat exchanger;
    a compressor fluidly coupled to the outdoor heat exchanger;
    a plurality of indoor heat exchangers corresponding to a plurality of enclosed spaces, the plurality of indoor heat exchangers coupled in parallel to the compressor;
    a plurality of circulation fans, a first circulation fan of the plurality of circulation fans disposed with a first indoor heat exchanger of the plurality of heat exchangers and configured to circulate air around the first indoor heat exchanger;
    a plurality of zone controllers electrically coupled to each circulation fan of the plurality of circulation fans, wherein each zone controller of the plurality of zone controllers is configured to:
        measure a temperature of a first enclosed space of the plurality of enclosed spaces, the first enclosed space containing the first indoor heat exchanger and the first circulation fan;
        determine whether a difference exists between the measured temperature of the first enclosed space and a setpoint temperature of the first enclosed space;
        responsive to a determination that a difference exists between the measured temperature of the first enclosed space and the setpoint temperature, adjust a speed of the first circulation fan of the plurality of circulation fans in the first enclosed space, wherein a timer unit is employed such that the first circulation fan operates at the adjusted speed for a minimum time period before the adjusted speed of the first circulation fan is subsequently changed;

determine whether the difference between the measured temperature of first enclosed space is higher or lower than the setpoint temperature;

responsive to a determination that the measured temperature of first enclosed space is higher than the setpoint temperature, operate the HVAC system in a cooling mode; and responsive to a determination that the measured temperature of first enclosed space is lower than the setpoint temperature, operate the HVAC system in a heating mode.

8. The HVAC system of claim 7, comprising a plurality of branch controllers, a branch controller of the plurality of branch controllers coupled to the first indoor heat exchanger of the plurality of indoor heat exchangers.

9. The HVAC system of claim 8, wherein the branch controller of the plurality of branch controllers reverses refrigerant flow through the first indoor heat exchanger of the plurality of indoor heat exchangers allowing the first indoor heat exchanger to operate in one of the heating mode and the cooling mode.

10. The HVAC system of claim 9, wherein select indoor heat exchangers of the plurality of indoor heat exchangers operate in the heating mode while other indoor heat exchangers of the plurality of indoor heat exchangers operate in the cooling mode.

11. The HVAC system of claim 7, wherein responsive to the difference between the measured temperature and the setpoint temperature in the first enclosed space of the plurality of enclosed spaces being below a first threshold temperature difference, a first zone controller of the plurality of zone controllers directs the first circulation fan to operate at low speed.

12. The HVAC system of claim 7, wherein responsive to the difference between the measured temperature and the setpoint temperature in the first enclosed space of the plurality of enclosed spaces being between a first threshold temperature difference and a second threshold temperature difference, a first zone controller of the plurality of zone controllers directs the first circulation fan to operate at medium speed.

13. The HVAC system of claim 7, wherein responsive to the difference between the measured temperature and the setpoint temperature in the first enclosed space of the plurality of enclosed spaces being above a second threshold temperature difference, a first zone controller of the plurality of zone controllers directs the first circulation fan to operate at high speed.

14. A method of fan speed control for an HVAC system, the method comprising:

measuring, with a temperature sensor, a temperature of a zone of a plurality of zones;

communicating the measured temperature to a zone controller disposed within with the zone;

determining, by the zone controller, whether a difference exists between the measured temperature of the zone and a setpoint temperature of the zone;

responsive to a determination that a difference exists between the measured temperature and the setpoint temperature, adjusting a speed of a circulation fan disposed within the zone wherein a timer unit is employed such that the circulation fan operates at the adjusted speed for a minimum time period before the adjusted speed of the circulation fan is subsequently changed;

determining, by the zone controller, whether the difference between the measured temperature is higher or lower than the setpoint temperature;

responsive to a determination that the measured temperature is higher than the setpoint temperature, operating the HVAC system in a cooling mode; and responsive to a determination that the measured temperature is lower than the setpoint temperature, operating the HVAC system in a heating mode.

15. The method of claim 14, comprising operating an indoor heat exchanger associated with the circulation fan in one of the heating mode and the cooling mode.

16. The method of claim 14, wherein responsive to the difference between the setpoint temperature and the measured temperature being below a first threshold temperature difference, the zone controller directs the circulation fan to operate at low speed.

17. The method of claim 14, wherein responsive to the difference between the setpoint temperature and the measured temperature being between a first threshold temperature difference and a second threshold temperature difference, the zone controller directs the circulation fan to operate at medium speed.

18. The method of claim 14, wherein responsive to the difference between the setpoint temperature and the measured temperature being above a second threshold temperature difference, the zone controller directs the circulation fan to operate at high speed.

19. The method of claim 14, comprising measuring a relative humidity of the zone of the plurality of zones with a humidity sensor electrically coupled to the zone controller.

20. The method of claim 19, comprising utilizing the zone controller to adjust the speed of the circulation fan responsive to the measured relative humidity of the zone of the plurality of zones.

\* \* \* \* \*